No. 892,967.

PATENTED JULY 7, 1908.

S. C. THOMAS.
SEED PLANTER.
APPLICATION FILED AUG. 26, 1907.

2 SHEETS—SHEET 1.

Witnesses:
R. E. Hamilton
H. C. Rodgers

Inventor,
S. C. Thomas
By George H. Hooper
Atty

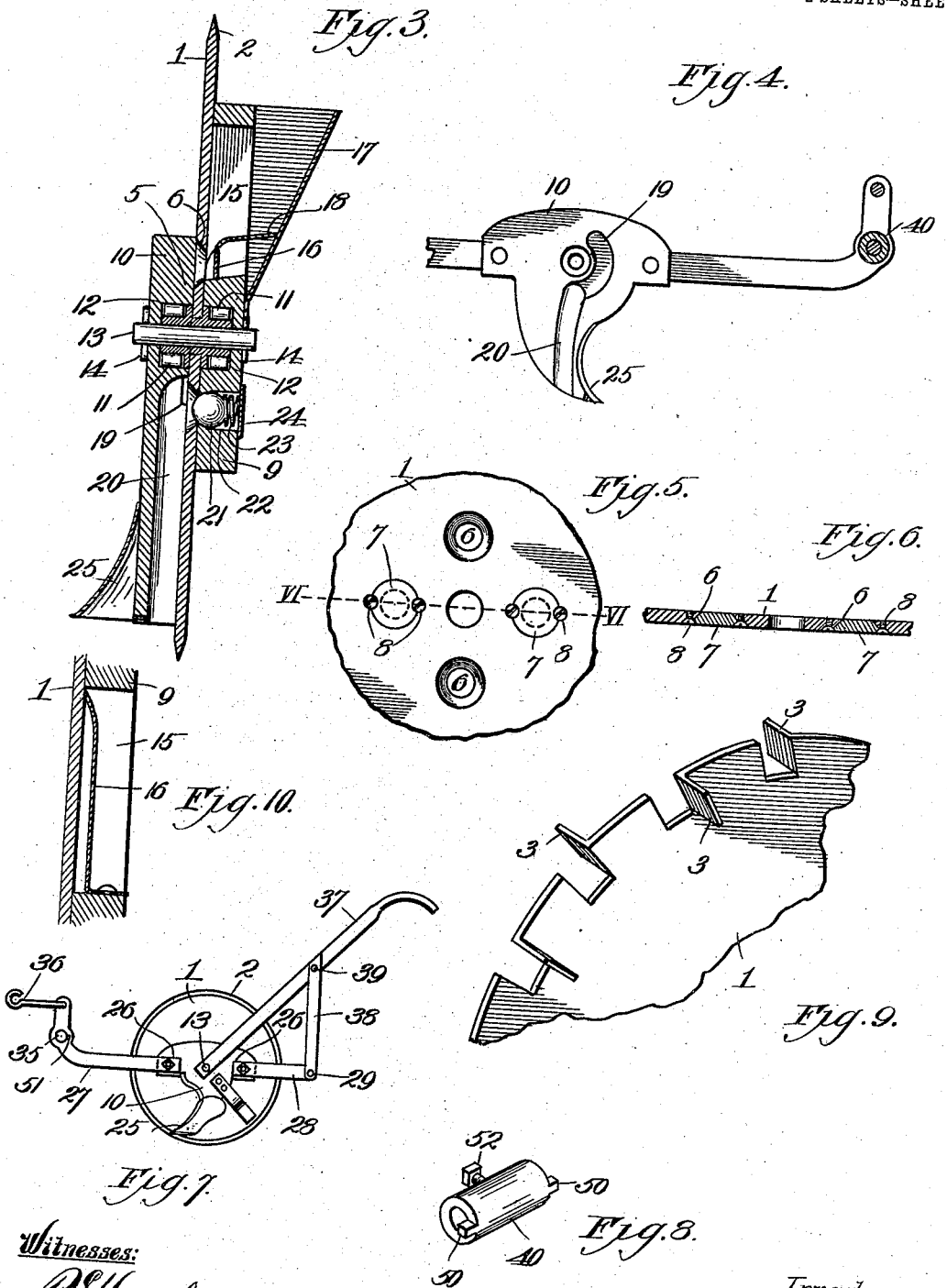

UNITED STATES PATENT OFFICE.

SAMUEL C. THOMAS, OF BEAN LAKE STATION, MISSOURI.

SEED-PLANTER.

No. 892,967.

Specification of Letters Patent.

Patented July 7, 1908.

Application filed August 26, 1907. Serial No. 390,099.

*To all whom it may concern:*

Be it known that I, SAMUEL C. THOMAS, a citizen of the United States, residing at Bean Lake Station, in the county of Platte and State of Missouri, have invented certain new and useful Improvements in Seed-Planters, of which the following is a specification.

This invention relates to seed planters and my object is to produce an efficient and reliable machine of this character which can be used as an ordinary seed planter or for re-planting purposes as an attachment to a lister cultivator. A further object is to produce a machine of the character outlined of simple, strong, durable and cheap construction.

To these ends the invention consists in certain novel and peculiar features of construction and organization as hereinafter described and claimed; and in order that it may be fully understood reference is to be had to the accompanying drawings, in which:—

Figure 1:
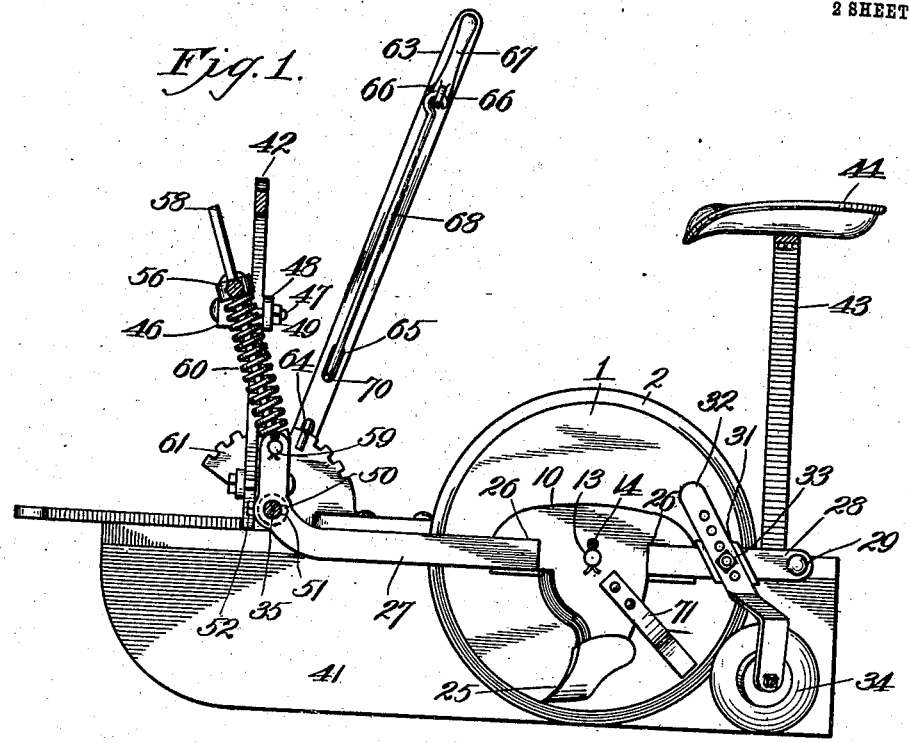
Figure 2:
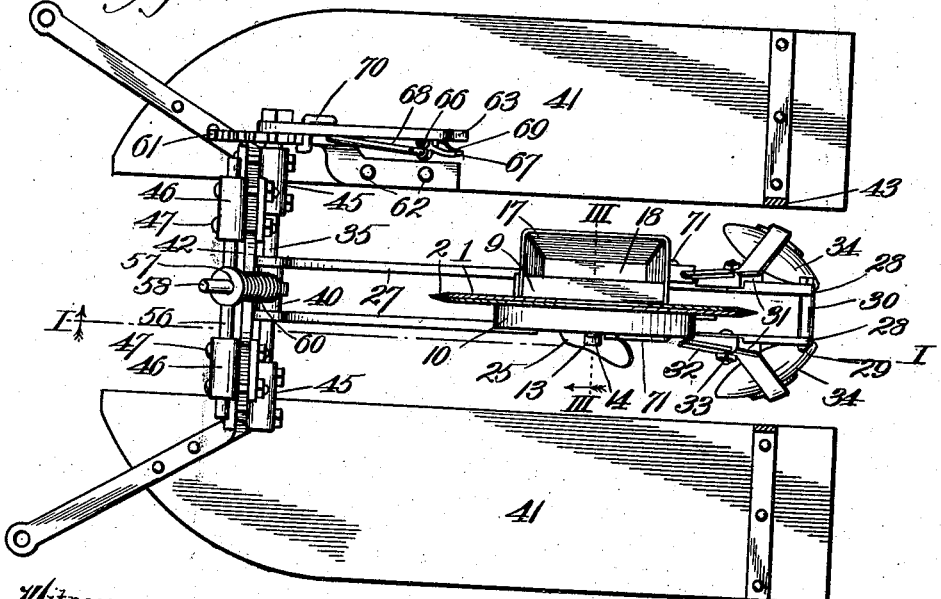

Figure 1, is a vertical section of a machine embodying my invention taken on the line I—I of Fig. 2, and also shows a sled cultivator associated therewith. Fig. 2, is a top plan view of the same with the seat-carrying arch of the cultivator in section. Fig. 3, is an enlarged vertical section taken on the line III—III of Fig. 2. Fig. 4, is an inner face view of one of the seed-spout plates. Fig. 5, is a side view of a seed-dropping wheel having alternate holes closed by plugs. Fig. 6, is a section on the line VI—VI of Fig. 5.
Fig. 7, is a side view on a reduced scale of the machine when arranged as an ordinary planter. Fig. 8, is a detail perspective view of a sleeve forming part of the machine. Fig. 9, is an enlarged detail perspective view of a modified form of the seed-dropping wheel. Fig. 10, is a horizontal section to show the adjustable connection of the spring with the seed-dropping wheel to accommodate the size or grade of corn employed.

In the said drawings where like reference characters indicate corresponding parts, 1 indicates a seed-dropping wheel adapted to be turned by its frictional engagement with the ground and provided with a sharpened edge 2, or it may be a thin edge and be provided with tongues 3 projecting alternately outward in opposite directions as shown in Fig. 9, these tongues being preferably produced by stamping them out of the body of the wheel. The wheel is provided with a hub 5 of any suitable type and with a plurality of flaring holes 6 through which the seed is adapted to pass as hereinafter explained, and when it is desired to space the grain at greater distances apart upon the ground certain of said holes may be closed by means of frustum-shaped plugs 7, said plugs being preferably secured in the holes by set-screws 8 as shown clearly in Figs. 5 and 6.

The hub of the wheel is journaled in a pair of seed-spout plates 9 and 10, between which the wheel is snugly fitted, anti-friction rollers 11 being preferably interposed between the peripheral end portions of the hub and the circular walls of the sockets or recesses 12 formed in said plates to receive the hub. The plates and wheel are secured in operative relation by a pin 13 extending through the plates and hub and engaged by spring-cotter 14 at the outer sides of the plates.

Plate 9 projects upward above plate 10 and is provided with an opening 15 having its lower end at a distance from the axis of the wheel corresponding to the seed-dropping holes therein, and extending across said opening 15 is a spring 16 having one end adjustably secured to plate 9 and its opposite or free end pressing yieldingly against the corresponding face of the wheel when no hole 6 of the latter happens to be opposite said free end of said spring, the body of the spring being disposed parallel with and a distance from the wheel slightly exceeding the thickness of a grain of corn for the purpose of compelling such grain to slip edgewise between the wheel and spring 16 and thus insure their proper ejection by the free end of said spring plate, into the holes 6 as they successively come opposite said ends of the spring. Plate 9 in conjunction with the angle plate 17 constitutes a hopper to contain a supply of grain and to direct such grain toward the wheel and deliver each grain edgewise into the space between the wheel and the spring, the hopper is provided with a false bottom 18 which slants downward toward and terminates just above the spring 16.

The plate 10 is provided forward of its axis with a shallow channel 19 in the plane of circular movement of holes 6 so that each of said holes for something less than one-half a revolution of the wheel, shall be in communication with the channel 19, the grain of corn in the registering hole 6 tending to project from the latter into said channel and to be delivered from said channel by the wheel into the spout passage 20 below the axis of the wheel, each grain being compelled to fall through said spout as it registers with the same by means of the plunger or ejector 21 in hole 22 of plate 9, a spring 23 exerting pressure on said plunger or ball and on a cover plate 24 at the opposite end of said hole, to force the plunger or ball partly into each hole 6 in the rotation of the wheel, the projection of the plunger or ball into said hole obviously dislodging any grain of corn sticking in the hole. The seed-spout is provided with a furrow opener in the form of a mold-board 25, the point of the mold-board being in the vertical plane of the seed-spout, it being noticed by reference to Fig. 3 that one wall of said spout is formed by the wheel itself.

In the horizontal plane of pin 13 and forward and rearward of the latter, the plate 10 is provided with sockets 26, the plate 9 having similar sockets, not shown, and fitting and bolted in the sockets 26 of said plates 9 and 10 are longitudinal bars 27, longitudinal bars 28 fitting in the rear set of sockets 26 of said plates and being likewise bolted thereto, the rear ends of bars 28 being preferably connected by a bolt 29 and spaced apart by a sleeve 30 mounted on said bolt.

31 indicates channeled brackets secured on bars 28 and 32 angular bars adjustably secured as at 33 to brackets 31, the lower ends of angular bars 32 being equipped with covering disks 34 to turn the soil inward and cover the grains of corn immediately after they are dropped into the furrow from the spout passage, the grain covering devices being adjustable to accommodate the planting of the grain at different depths.

The front end of the frame of the machine, constituted by bars 27, 28, and the seed plates, turns upward at its front end and is connected by a pin or bolt 35 and above the latter, by preference is equipped with draft-hooks 36, that is, is equipped with such hooks when the machine is to be used as an ordinary planter, and at such time the machine will be provided with the ordinary plow handles 37 secured at their lower or front ends on pin 13 and braced by means of braces 38 secured at their lower ends to bolt 29 and at their upper ends to the handles as at 39 or otherwise, a sleeve 40 being mounted on pin or bolt 35 to act as a washer and space the front ends of bars 27 the requisite distances apart.

When the machine is to be used as a replanter it is applied to the sled of an ordinary lister cultivator, the sled comprising two parallel sections 41 connected by a front arch 42 and a rear arch 43, the latter forming a support for the seat 44. When used in conjunction with said sled, the planter is itself provided with attachments whereby it is secured to the sled and may be thrown to operative or inoperative position by the driver, it being understood that its use in replanting is primarily to plant grains of corn in the furrows where corn has failed to make its appearance by the time the field of listed corn is to be cultivated the first time. For such purpose the dropping of the corn must be under the control of the driver and to accomplish this the attachments referred to are provided and are as follows:—45 and 46 indicate a lower and an upper set of bearing blocks, bolts 47 extending through said blocks at the outer and inner sides of the upright portions of the arch 42, and fitting upon said bolts at the opposite side of the arch are clamp plates 48 held in place by clamping nuts 49 engaging the ends of the bolts 47, the lower set of bearing blocks being disposed at the rear side and the upper set at the front side of said arch. When used as a replanter the pin or bolt 35 hereinbefore mentioned is of sufficient length to be journaled in bearing blocks 45, and when so used the spacing sleeve 40 is provided with tenons 50 projecting from its ends and engaging notches 51 in the bars 27, to interlock the latter with the sleeve, the latter being secured by set-screw 52 rigidly upon the pin 35.

56 is a cross rod journaled in bearing blocks 46 and provided with a central hole 57 through which slidingly extends a rod 58 pivoted at its lower end on a cross pin or bolt 59 connecting the upper ends of bars 27, when the machine is used as a replanter, and mounted on said rod and interposed between its head and rod 56 is a helical spring 60 for the purpose of either holding the wheel 1 yieldingly against the ground or for holding it above the ground, as hereinafter referred to.

61 indicates a toothed-sector arranged concentrically with respect to pin or shaft 35 and bolted by preference to the right-hand section of the sled as at 62.

63 indicates a lever secured rigidly on the shaft or pin 35 and provided with slots 64 and 65 and with a pair of ears 66. 67 is a grip-lever pivoted to said ears and 68 is a dog pivoted to the grip-lever and pressed normally toward the sector by spring 69 interposed between lever 63 and grip-lever 67. The dog 68 is in the form of a rod having its extremities at the same side of lever 63 as the sector and provided with a U-shaped portion 70 of which the bridge lies at the outer side of lever 63, the upper arm extends through slot 65 and the lower arm through slot 64, the last-named arm being adapted to be held normally in engagement with one of the notches of the sector.

It will be noticed by reference to Fig. 1 that the tendency of spring 60 is to hold wheel 1, pressed down upon the ground and that the latch-mechanism constituted by the parts numbered from 61 to 70 inclusive, is utilized to lock the seed-dropping wheel in the desired position so that it shall plant at a uniform depth. By grasping the lever 63 and the grip-lever 67 the dog will be withdrawn from engagement with the sector. The lever may then be thrown forward for the purpose of rocking pin or shaft 35 and raising the wheel 1 off the ground. The first part of this raising movement is resisted by spring 60, but as soon as bolt 59 passes the plane occupied by pins 35 and 56, said spring starts to expand and coöperates with the lever movement in raising the seed dropping wheel, and also tends to support said wheel in its elevated position and thus relieve the latch-mechanism of considerable strain.

For the purpose of preventing earth from accumulating on the side of the seed-dropping wheel, I provide a pair of scrapers 71 secured to seed-spout plates 9 and 10 as shown in Figs. 1 and 2, or otherwise.

In practice as the lister cultivator is drawn across the field,—the cultivator appliances of such machine being omitted from the drawings in this case as unnecessary,—the driver upon the seat watches for spaces in the furrow where corn has not sprouted and when he notes such a space he grasps lever 63, unlocks the latch-mechanism and lowers wheel 1, the result being said wheel travels upon the ground in line with the growing plants and at regular intervals drops a grain of corn into the shallow groove turned by the plow or furrow-opener 25. As the wheel reaches the end of the unplanted strip (which may be a few feet or several yards long, being usually the work of moles) the driver raises the wheel to inoperative position and permits it to remain in such a position until he again encounters an unplanted strip, when he repeats the operation described. It will thus be seen that the machine can be conveniently applied to an ordinary lister cultivator for the purpose of planting while the cultivating operation of the sprouted corn is in progress.

From the above description it will be apparent that I have produced a machine embodying the features of the advantage enumerated as desirable in the statement of the object of the invention, and I wish it to be understood that changes in the form, proportion, detail construction and arrangement of the parts may be resorted to without departing from the principle of construction involved.

Having thus described the invention what I claim as new and desire to secure by Letters Patent, is:—

1. In a seed-planter, a wheel provided with perforations arranged concentrically around its axis, a plate forming a journal for said wheel and fitting snugly against the same and provided with a hopper of which the wheel forms one side and said holes successive discharge openings for the hopper when the wheel is revolved.

2. In a seed-planter, a wheel provided with perforations arranged concentrically around its axis, a plate forming a journal for said wheel and fitting snugly against the same and provided with a hopper of which the wheel forms one side and said holes successive discharge openings for the hopper when the wheel is revolved, and a companion plate at the opposite side of and forming a journal and a closure for the holes of the wheel, and provided with a spout passage with which the holes successively come into engagement.

3. In a seed-planter, a wheel provided with perforations arranged concentrically around its axis, a plate forming a journal for said wheel and fitting snugly against the same and provided with a hopper of which the wheel forms one side and said holes successive discharge openings for the hopper when the wheel is revolved, and a companion plate forming a journal for the wheel at its opposite side and fitting snugly against the same and provided with a curved channel with which successively registers said holes of the wheel, and with a spout at the lower end of and communicating with said channel having one side formed by said wheel.

4. In a seed-planter, a wheel provided with perforations arranged concentrically around its axis, a plate forming a journal for said wheel and fitting snugly against the same and provided with a hopper of which the wheel forms one side and said holes successive discharge openings for the hopper when the wheel is revolved, a companion plate at the opposite side of the wheel and also forming a journal therefor and a closure for the holes of the wheel, and provided with a spout passage with which the holes successively come into engagement, and a spring-actuated plunger mounted in the first-named plate and engaging the wheel opposite the seed-spout and adapted as the holes of the wheel successively register with said spout to project into said holes at the opposite side and insure the ejection of the grain of corn which may be therein, into said spout.

5. In a seed-planter, a wheel provided with perforations arranged concentrically around its axis, a plate forming a journal for said wheel and fitting snugly against the same and provided with a hopper of which the wheel forms one side and said holes successive discharge openings for the hopper when the wheel is revolved, a companion plate at the opposite side of the wheel and also forming a journal therefor and a closure for the holes of the wheel, and provided with a spout passage with which the holes successively come into engagement, and a furrow-opener attached to the lower end of the plate provided with a spout to produce a furrow into which the corn may drop from the spout.

6. In a seed-planter, a wheel provided with perforations arranged concentrically around its axis, a plate forming a journal for said wheel and fitting snugly against the same and provided with a hopper of which the wheel forms one side and said holes successive discharge openings for the hopper when the wheel is revolved, a companion plate at the opposite side of the wheel and also forming a journal therefor and a closure for the holes of the wheel, and provided with a spout passage with which the holes successively come into engagement, a furrow-opener attached to the lower end of the plate provided with a spout to produce a furrow into which the corn may drop from the spout, and means for turning the soil into said furrow after the corn has been dropped therein.

7. In a seed-planter, a plate provided with an opening and with a hopper communicating therewith, a companion plate having a seed-spout, a wheel fitting snugly between and journaled in said plates and forming the inner sides of the hopper and seed-spout respectively and provided with a plurality of holes for successive engagement with said opening and spout, and a spring within and at the bottom of the hopper and substantially paralleling the proximate face of the wheel and having one end secured to the plate and the other turned toward the wheel.

8. In a seed-planter, a plate provided with an opening and with a hopper communicating therewith, a companion plate having a seed-spout, a wheel fitting snugly between and journaled in said plates and forming the inner sides of the hopper and seed-spout respectively and provided with a plurality of holes for successive engagement with said opening and spout, and a spring within and at the bottom of the hopper and substantially paralleling the proximate face of the wheel and having one end secured to the plate and the other turned toward the wheel, and a deflector within the hopper and projecting into the opening of the first-named plate and terminating over the said spring.

9. The combination with a sled having its runners connected by arches, of a seed-planter arranged between the runners of the sled and embodying a frame pivoted for vertical movement at its front end, a cross-bar carried by the front arches and suitably journaled at its ends, a rod extending slidingly through said bar and pivoted at its lower end to the frame above the pivotal point of the latter, a lever to rock the frame so as to raise or lower the seed dropping mechanism, and a spring tending to hold said mechanism in its elevated or depressed position.

10. The combination with a sled having its runners connected by arches, of a seed-planter arranged between the runners of the sled and embodying a frame pivoted for vertical movement at its front end, a cross-bar carried by the front arches and suitably journaled at its ends, a rod extending slidingly through said bar and pivoted at its lower end to the frame above the pivotal point of the latter, a lever to rock the frame so as to raise or lower the seed dropping mechanism, and a spring tending to hold said mechanism in its elevated or depressed position, and a latch-mechanism to lock the lever with planter frame adjusted as desired.

In testimony whereof I affix my signature, in the presence of two witnesses.

SAMUEL C. THOMAS.

Witnesses:
EDGAR L. GARDNER,
JESSE J. STANTON.